US011656969B2

(12) United States Patent
Kerlin et al.

(10) Patent No.: US 11,656,969 B2
(45) Date of Patent: *May 23, 2023

(54) USING MACHINE LEARNING MODEL TO MAKE ACTION RECOMMENDATION TO IMPROVE PERFORMANCE OF CLIENT APPLICATION

(71) Applicant: Data.ai Inc., San Francisco, CA (US)

(72) Inventors: Jess Robert Kerlin, Walnut Creek, CA (US); Eric Antoine MacKinnon, Henderson, NV (US); Paul Ernest Stolorz, Los Altos, CA (US)

(73) Assignee: Data.ai Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/540,128

(22) Filed: Dec. 1, 2021

(65) Prior Publication Data

US 2022/0398183 A1    Dec. 15, 2022

Related U.S. Application Data

(63) Continuation of application No. 17/346,117, filed on Jun. 11, 2021, now Pat. No. 11,221,937.

(51) Int. Cl.
*G06F 11/34* (2006.01)
*G06N 20/00* (2019.01)

(52) U.S. Cl.
CPC ...... *G06F 11/3452* (2013.01); *G06F 11/3495* (2013.01); *G06N 20/00* (2019.01)

(58) Field of Classification Search
CPC .. G06F 11/3452; G06F 11/3495; G06N 20/00
USPC ......................................................... 702/179
See application file for complete search history.

(56) References Cited

U.S. PATENT DOCUMENTS

| 11,221,937 B1* | 1/2022 | Kerlin | G06F 11/302 |
| 2021/0081377 A1* | 3/2021 | Polleri | G06F 11/3003 |

FOREIGN PATENT DOCUMENTS

| WO | 2018106214 | * 6/2018 | G06F 11/3414 |

* cited by examiner

*Primary Examiner* — John H Le
(74) *Attorney, Agent, or Firm* — Fenwick & West LLP (57) ABSTRACT

A system and a method are disclosed for recommending a set of actions to be performed to improve a target performance metric of a client application. An action recommendation system receives the target performance metric from a user associated with the client application. The action recommendation system determines features of the client application describing characteristics and performance history of the client application. The features of the client application and the target performance metric is provided as input to a machine learning model that outputs sets of target features that are likely to result in improvement for the target performance metric. The action recommendation system ranks the sets of target features and selects one of the sets based on the ranking. The action recommendation system determines a set of recommended actions based on the selected set of target features and presents the set of recommended actions to the user.

18 Claims, 5 Drawing Sheets

Receive input of a target performance metric of a client application
510

Determine a plurality of features of the client application
520

Input the target performance metric and the plurality of features of the client application into a machine learning model and receive as output from the machine learning model one or more sets of target features different from the plurality of features of the client application
530

Rank the one or more sets of target features output from the supervised machine learning model
540

Select a set of target features from the one or more sets of target features based on the ranking
550

Determine a set of recommended actions associated with the selected set of target features
560

Provide, for display, the selected set of recommended actions to be performed on the client application
570

FIG. 5

USING MACHINE LEARNING MODEL TO MAKE ACTION RECOMMENDATION TO IMPROVE PERFORMANCE OF CLIENT APPLICATION

TECHNICAL FIELD

The disclosure generally relates to the field of machine learning, and more particularly relates to using a machine learning model to recommend actions that can improve a target performance metric of a client application.

BACKGROUND

An application developer has to make many decisions to select features of a client application. For example, the application developer for a game application has to select the type of game (e.g., casual game, puzzle game, arcade game), game-play features (e.g., rules of the game, goal of the game), targeted audience (e.g., age group, location) as well as many other features that can affect performance of the application. To determine ways of modifying the features of the client application to improve the performance of the client application, the application developer may collect and analyze performance data of the client application, market information of other client applications for benchmarking, or other data on factors that can affect the performance of the client applications to determine which combinations would lead to better performance. However, there is a tremendous amount of data to analyze, and it is time consuming and difficult to sort through the data and isolate parts that are relevant to determining how to improve performance of the client application. Additionally, there is a virtually unlimited number of combinations of features that the application developer can choose from, so it is difficult to determine which combination of features would be effective and cost efficient.

Existing machine learning implementations are insufficient to automate the above-described inefficiencies for manual computation. Given the volume of data available and variety in the features of the historical client applications, the training data is noisy and overbroad. Moreover, collecting, storing, and training on such huge data lakes requires huge amounts of memory and computational power that renders machine learning models more or less static in nature, and unable to adapt as new information comes in, as re-training models requires ingesting huge amounts of data in a time and processing-power intensive manner.

SUMMARY

The systems and methods disclosed herein address the above-described problems relating to analysis of historical client application data, isolating relevant pieces of data to include in training data of a machine learning model configured to output determine additional features for a particular client application that would improve the performance of the client application in an efficient and practical manner. To select effective training data for the machine learning model, an action recommendation system monitors activities of client applications to identify when a feature of a client application has changed and a change in one or more performance metrics (e.g., number of installs, number of positive reviews) that occur as a result of the change in the feature. The relationships between changes in features and corresponding changes in performance metrics are labelled and used to train the machine learning model, and the accuracy of the machine learning model that determines additional features associated with better performance for client applications can be improved while reducing computational expenses in training and applying the machine learning model.

Systems and methods are disclosed herein for an action recommendation system that provides recommended actions for improving performance of a client application. A user associated with a client application may request a recommendation for actions that can be taken to improve in a target performance metric of the client application. The action recommendation system determines features associated with the client application and inputs the features and the target performance metric to a machine learning model. The machine learning model is trained using training data including sets of changes observed in features of historical client applications and resulting changes in performance metrics of the historical applications. Because the machine learning model is trained based on changes in features that have been effective at improving performance metrics of historical client applications, the machine learning model can identify additional features that are likely to improve the user selected target performance metric for the client application. The trained machine learning model is configured to output sets of target features different from current features of the client application that are likely to improve the target performance metric. The output sets of target features are features of historical client applications that are similar to the client application that have had success in the target performance metric. The action recommendation system 130 ranks the sets of target features identified by the machine learning model and selects one of the sets based on the ranking. After selecting a set of target features, the action recommendation system identifies actions that the user can perform to implement the selected set of target features and presents the recommended actions.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Computing Environment for Action Recommendation System

Figure 1:
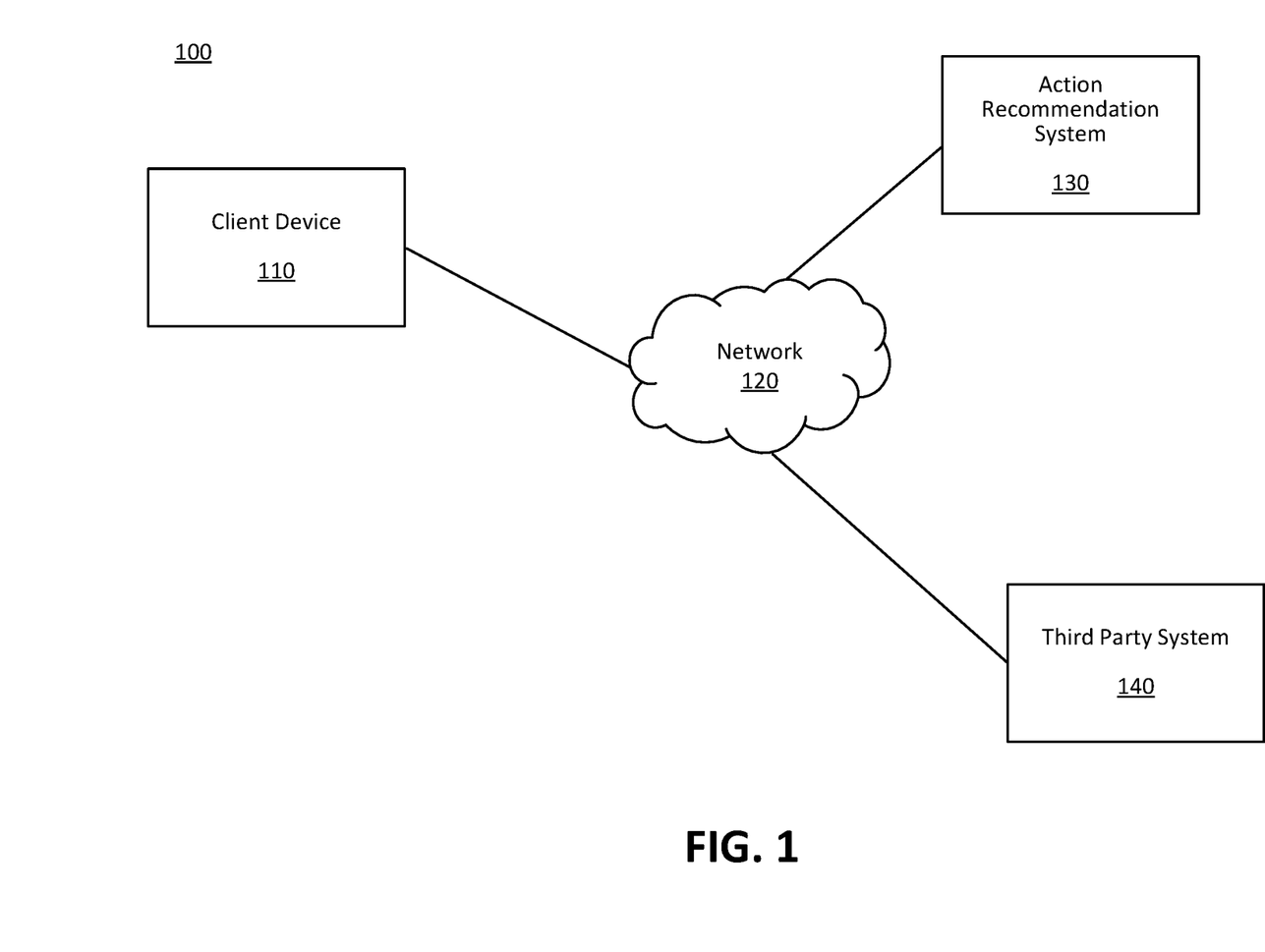
FIG. 1 illustrates a block diagram of a computing environment for an action recommendation system, according to an embodiment.

FIG. 1 illustrates a block diagram of a computing environment for an action recommendation system, according to an embodiment. Environment 100 includes one or more client devices 110, an action recommendation system 130, and one or more third party systems 140 that communicate with each other over a network 120. FIG. 1 illustrates one client device 110 and one third party system 140, but there may be multiple instances of each of these entities, and the functionality of the action recommendation system 130 may be distributed or replicated across multiple servers.

A client device 110 is a device operated by one or more users (e.g., administrator, analyst, application developer) associated with a client. The term "client application", as used herein, may refer to a computer program or a software application that provide a set of services to its accessing users. A client application may be a native application, a web-based application, or a hybrid application. The client device 110 may access functions of the action recommendation system 130 to receive analysis related to the performance of the client application including a recommendation on a set of actions to be performed on the client application to improve performance for a target performance metric selected by the user. The client device 110 may have an application installed thereon to access the functions of the action recommendation system 130.

The client device 110 is a computing device capable of receiving user input as well as transmitting and/or receiving data via the network 102. In one embodiment, a client device 110 is a smartphone, a tablet or a conventional computer system, such as a desktop or laptop computer. Alternatively, a client device 110 may be a device having computer functionality that accesses a set of mobile applications. A client device 110 is configured to communicate via the network 120. In one embodiment, the client device 110 executes a mobile application allowing a user of the client device 110 to interact with the action recommendation system 130. For example, the client device 110 executes a browser application that may enable interaction between the client device 110 and the action recommendation system 130 via the network 120. In another embodiment, a client device 106 interacts with the action recommendation system 130 through an application programming interface (API) running on a native operating system of the client device 110, such as IOS® or ANDROID™.

The action recommendation system 130 applies a machine learning model to information associated with client applications to provide insights on the performances of client applications and recommend an action to improve performance of the client applications. The action recommendation system 130 may collect data based on activity within the action recommendation system 130 and receive data that may be relevant for providing insights on the performance of applications. To make a recommendation to a particular client application, the action recommendation system 130 inputs features of the client application and target performance metric for the client application to the machine learning model and determines target features for the client application that can cause the target performance metric to improve based on output from the model. Based on the target features, the action recommendation system 130 identifies actions that can be taken to remove, modify, or add features of the client applications to improve the target performance metric. Further details of the action recommendation system 130 are detailed below with respect to FIG. 2.

The system environment may additionally include third party systems 140. The third party systems 140 may provide additional information regarding client applications that may be used by the action recommendation system 130 to make action recommendations. For example, a third party system 140 may be a survey management system, application distributor, an advertising network, an advertisement publisher, or another entity that collects information associated with client applications.

The client devices 110, the action recommendation system 130, and the client data management system 140 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML).

Figure 2:
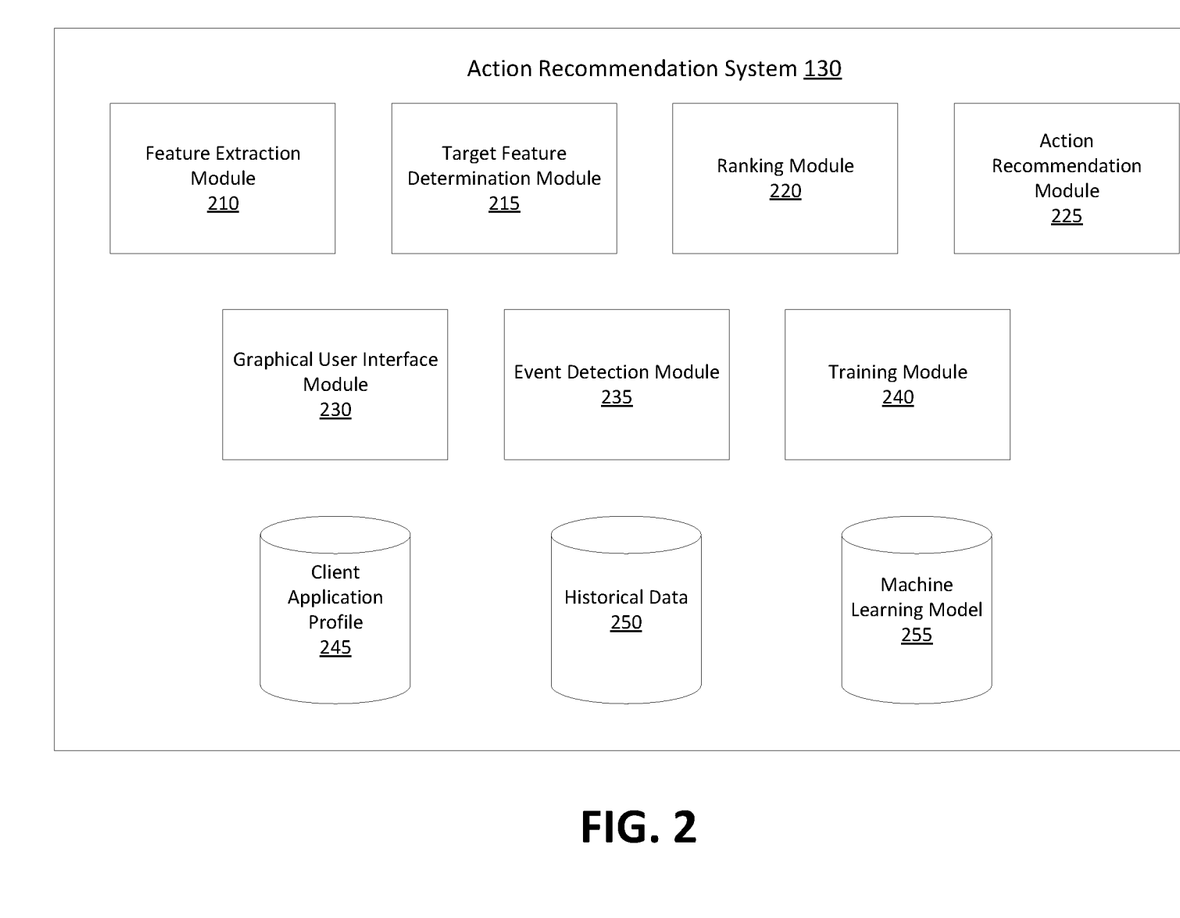
FIG. 2 illustrates a block diagram of modules and databases used by an action recommendation system, according to an embodiment.

FIG. 2 illustrates a block diagram of modules and databases used by an action recommendation system, according to an embodiment. The action recommendation system 130 as depicted in FIG. 2 includes a feature extraction module 210, a target feature determination module 215, a ranking module 220, an action recommendation module 225, a graphical user interface module 230, an event detection module 235, a training module 240, a client application profile database 245, a historical data database 250, and a machine learning model database 255. The modules and databases depicted in FIG. 2 are merely exemplary; more or fewer modules and/or databases may be used by the action recommendation system 130 in order to achieve the functionality described herein. Moreover, these modules and/or databases may be located in a single server, or may be distributed across multiple servers. Some functionality of action recommendation system 130 may be installed directly on the client device 110 as a component of an application associated with the action recommendation system 130.

Feature extraction module 210 identifies features associated with a client application. The action recommendation system 130 has access to unstructured data associated with the client application including data stored in a profile of the client application from the client application profile database 245, data provided by a user associated with the client application, or data provided by third party systems 140. The data may include characteristics of the client application, performance history of the client applications, demographic data of users of the client application, events, market research data, and publicly reported data. From the data, the feature extraction module 210 may extract features which are relevant portions of the data that are processed to be provided as input to the machine learning model such as a type of industry associated with the client application (e.g., entertainment, financial, productivity, educational, lifestyle, social media), application genre (e.g., casual game, puzzle game, arcade game, action game, racing game), game-play features (e.g., rules of the game, goal of the game), characteristics (e.g., 2D vs. 3D, cartoon-type graphics, portrait vs. landscape), user feedback (e.g., ratings, comments), target demographics (e.g., age group, locations, platform), countries where the client application is available, client application description, creative size, advertising campaign (e.g., spending per ad platform, types of advertising campaigns), and other relevant attributes describing the client application. Features may also include historical and current performance of the client application for performance metrics such as number of downloads, application ranking, average rating, customer acquisition cost (CAC), cost per click (CPC), cost per install (CPI), lifetime value (LTV), return on ad spend (ROAS), session time, number of active users, and revenue.

Each extracted feature may be labelled as either adjustable or fixed. Adjustable features are features of the client application that can be added, removed, or changed by one or more actions performed by users that manage the client application. Fixed features are features of the client application that are determined to be a mandatory feature of the client application that should not be removed or changed. A user associated with the client application that is requesting a recommendation may input the fixed features to the action recommendation system. The user may provide the input via a GUI via the client device 110 to indicate which features are adjustable and/or fixed. For example, the GUI may provide a menu including a list of possible features and the user may interact with the menu to indicate which features the user is willing to adjust for the client application and which features should remain fixed.

In some embodiments, whether a feature is adjustable or fixed may be preconfigured by the action recommendation system 130 without input from the user. The action recommendation system 130 or a third party system 140 may determine which features are adjustable and which features are fixed based on computational resources and time associated with making changes to the features. For example, if the client application is for a puzzle game that is currently targeting people between ages of 25 and 35 and does not include bonus round, the adjustable features of the client application may include the target age group and the bonus round and the fixed features may include application industry and type of game. That is, the target group may be adjusted to include a different age group, and bonus rounds may be added to the game, but the type of industry would not be changed from an entertainment to a social media or productivity and the type of game would not be changed from a puzzle game to an action game. The action recommendation system 130 or a third party system 140 may label features as adjustable or fixed based on patterns in changes of features of historical client applications. For example, features observed to be changed by at least a threshold number of historical client applications may be labeled as adjustable features, and features observed to be changed by less than the threshold may be labeled as fixed features.

The target feature determination module 215 applies the machine learning model 255 to identify sets of target features different from the client application's current features that are likely to improve the client application's performance for a target performance metric that the user wishes to improve. The action recommendation system 130 may receive a target performance metric from the user via the GUI. A performance metric may be related to revenue, subscribing users, user engagement, user retention, or other goals for the client application. In combination with the ranking module 220 and the action recommendation module 225, the target feature determination module 215 identifies actions that can be taken to improve the target performance metric of the client application given the client application's current features and constraints in the adjustable features. In particular, the target feature determination module 215 is configured to identify sets of target features that are features of historical client applications similar to the client application that have had performance greater than a threshold in the specified target performance metric. These identified sets of target features include adjustable features but not fixed features.

The target feature determination module 215 inputs the features extracted by the feature extraction module 210, the adjustable features, and the target performance metric to the machine learning model, and receives sets of target features based on output from the machine learning model 255. In some embodiments, the machine learning model 255 is a supervised model that is trained by the training module 240 to output sets of target features for the client application, each set associated with a probability of the set of target features leading to an improvement in a user specified target performance metric. The machine learning model 255 may be a neural network, a decision tree, a polynomial regression model, a Bayesian network, and the like. Training data for the machine learning model 255 may include any data from historical data 250 related to historical client applications including features describing characteristics of the historical client applications and performance of the historical client applications. The historical data 250 may be based on information provided directly by historical client applications, activity of the historical client applications within the action recommendation system 130, or data provided by third party systems 140. Because the machine learning model 255 is trained with training data from a large volume of data related to characteristics and performance of historical client applications, the machine learning model 255 can be trained to determine the importance of features in various circumstances and determine sets of features that in combination lead to better performance. The target feature determination module 215 is configured to find combinations of target features that have been successful for historical client applications instead of finding novel combinations.

In some embodiments, the training data set may be provided by the event detection module 235. The event detection module 235 may analyze historical data 250 and detect events by monitoring changes in one or more features (e.g., removal, addition, or modification of features) associated with historical client applications and determine resulting changes in one or more performance metric. The event detection module 235 may generate annotated sets that describe the changes in the features and the changes in performance metrics to be used to train the machine learning model 255. In other embodiments, such events may be detected by one or more third party system 140 and provided to the action recommendation system 130.

In some embodiments, it may be sufficient or desired to provide recommendations for a client application based on statistical properties that are not tied to a particular target performance metric but rather reflect trends in the historical client applications. In such cases, unsupervised learning may be used to cluster feature sets such that the feature sets may be evaluated as individual classes composed of multiple historical client applications. An unsupervised clustering algorithm such as k-nearest neighbor selection and agglomerative hierarchical clustering may be used to identify such clusters. The identification of the most prevalent features within each unsupervised class may be compared to the features of the client application, and one or more missing features may be recommended as target features on the basis of popularity. In other embodiments, the target performance metric may be aggregated across all historical client applications within such clusters, and recommendations may be generated based on a ranking of performances of the clusters including historical client applications that share the fixed features selected by the user. Features of the highest ranking cluster may be compared to the features of the client application, and the missing features may be recommended as target features.

Each set of target features output by the machine learning model 255 is associated with a probability of the set of target features resulting in improvement for a target performance metric. After receiving the outputs from the machine learning model 255, the target feature determination module 215 may compare the probabilities associated with the sets of target features to a predetermined value to filter out one or more sets associated with a probability below the threshold. The target feature determination module 215 provides the sets of target features associated with probabilities greater than the predetermined threshold to the ranking module 220. In some embodiments, the target feature determination module 215 may determine, for each set of target features, an expected amount of improvement in the target metric if the target features were implemented. The target feature determination module 215 may compare the expected performance improvement for each set of target features to a predetermined threshold. That is, if a set of target features is likely to improve a target performance metric but the expected improvement is insignificant, the set of target features may not be provided to the ranking module 220.

The ranking module 220 ranks the sets of target features from the target feature determination module 215 and selects one set of target features to be recommended for the client application. The ranking module 220 may use one or more factors including expected improvement, distance weights, number of features in the set of target features, or other user client preferences. Distance weights are values that represent the distance between current set of features of the client application and the set of target features (e.g., cost of adopting the set of target features). For example, a first set of distance weights associated with a first set of target features that involves expanding services to a new country would indicate that it is more difficult and costly compared to a second set of distance weights associated with a second set of target features that involves adding keywords to the description of the client application in application store. The ranking module 220 is configured to consider performance benefits as well as the costs when ranking the sets of target features. Based on the ranking, the ranking module 220 selects the highest ranking set of target features and provides the selected set to the action determination module 225.

The action recommendation module 225 determines a set of recommended actions associated with the selected set of target features. The set of recommended actions are actions that modify the current features of the client application and when performed, are likely to improve the target metric specified by the user. The action recommendation module 225 may determine a difference between current features of the client application and the set of target features and identify actions that would cause the client application to have the target features. Examples of actions include adjusting the creative associated with the client application, changing advertisement campaigns, expanding services to different countries, adjusting budget, adjusting bid limits, adding or removing features, selecting alternative third party systems, adjusting search optimization parameters, changing target group, and other changes that can lead to performance improvement.

In some embodiments, after the action recommendation system 130 presents a set of recommended actions for a client application, the event detection module 235 monitors whether the recommended actions are performed. If a user does perform the recommended actions, the event detection module 235 determines a difference in expected change in performance metric and actual change in performance metric. The determined difference may be included in the training data used to train the machine learning model 255.

The GUI module 230 generates a graphical user interface to communicate with the user associated with the client application. In some embodiments, the GUI module 230 may receive a request from the client device 110 for a recommendation on a set of actions to improve performance of the client application. The request may include inputs from the user indicating the target performance, adjustable features, and/or fixed features. In response to the request, the GUI module 230 generates the graphical user interface that includes a recommendation on the actions that are likely to improve the client application's performance in the specified performance metric. The GUI is described in further detail with respect to FIG. 4.

Figure 3:
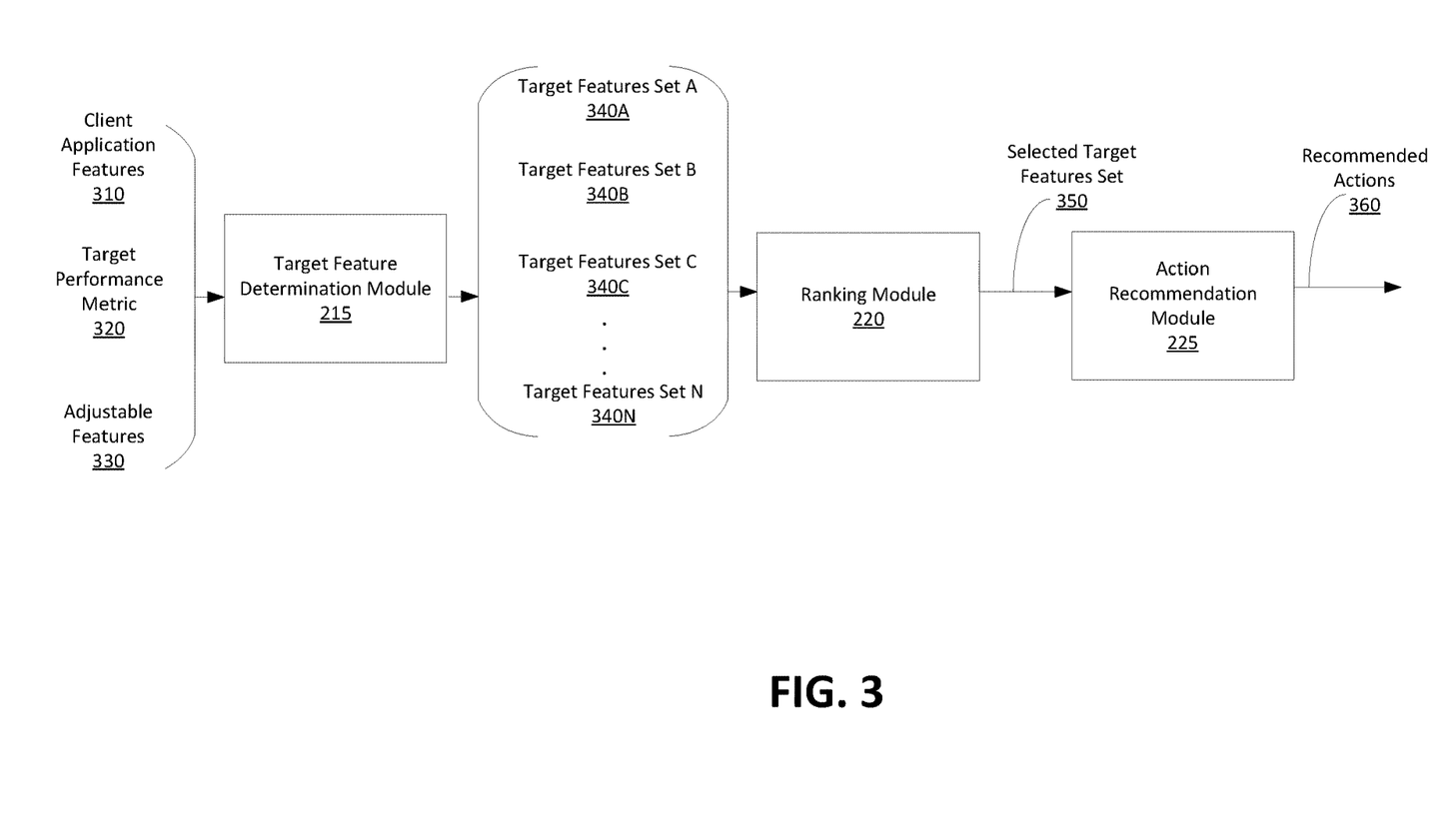
FIG. 3 illustrates an exemplary data flow for determining an action recommendation, according to an embodiment.

FIG. 3 illustrates an exemplary data flow for determining an action recommendation, according to an embodiment. To recommend actions 360 for a client application, FIG. 3 begins with client application features 310, target performance metric 320, and adjustable features 330 being provided as input to the target feature determination module 215 that applies the machine learning model 255 to determine target features sets 340. The client application features 310 may be determined by the feature extraction module 210 that analyzes information related to the client application and extracts the features. The target performance metric 320 is provided to the action recommendation system 130 by a user associated with the client application and represents an aspect of the client application the user wishes to improve. The adjustable features 330 may be preconfigured by the action recommendation system 130 or may be based on input from the user.

Each target features set 340 output by the machine learning model 255 includes features different from the client application features 310 and is determined by the machine learning model 255 to be associated with a probability greater than a predetermined threshold of resulting in improved performance for the target performance metric 320. Each feature included in a target features set 340 is an adjustable feature 330. The target feature sets 340 are provided to the ranking module 220 that ranks the plurality of target feature sets 340 based on expected improvement, distance weights, number of features in the set of target features, or other user client preferences. Based on the ranking, the ranking module 220 selects one target features set 350. The action recommendation module 225 receives the target features set 350 and determines recommended actions 360 to be presented to the user.

Exemplary Graphical User Interface of Action Recommendation System

Figure 4:
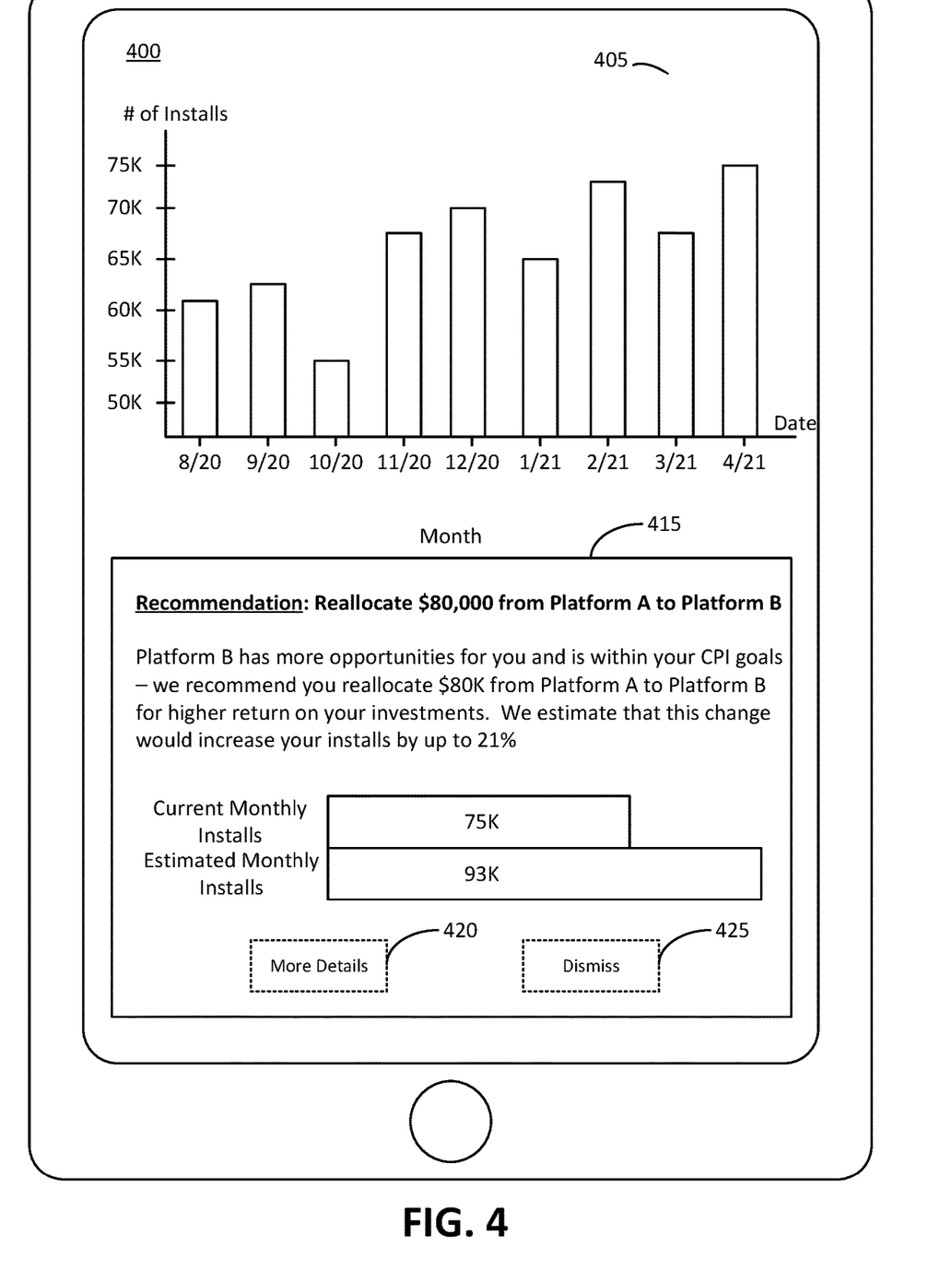
FIG. 4 illustrates an exemplary user interface for presenting an action recommendation to a user, according to an embodiment.

FIG. 4 illustrates an exemplary user interface for presenting an action recommendation to a user, according to an embodiment. The user interface 400 shown in FIG. 4 is presented by the GUI module 230 in response to a request from the user for a recommendation on actions that can be taken to improve the target performance metric of number of monthly installs. The GUI module 230 generates and presents the user interface 400, via an application installed on the client device 110, to a user associated with a client application to receive inputs from the user, provide analysis on the performance of the client application, and recommend actions that can improve the performance of the client application. Inputs from the user may specify the numerical target for the performance metric (e.g., increase the number of downloads to at least 90K) or just provide the performance metric of interest. Inputs may also indicate which features of the client application are adjustable and which features are fixed such that the recommendation only includes actions that affect the adjustable features. The GUI module 230 transmits the inputs (e.g., target performance metric 320, adjustable features 330) to the target feature determination module 215 to be used for generating the recommendation.

The user interface 400 includes a graph 405 that shows the number of monthly installs over time and a recommendation 415 for actions to be performed to increase the monthly number of downloads to at least 90K. For example, the action recommendation system 130 may recommend that the client application reallocate budget for advertisement from Platform A to Platform B. The recommendation 415 also includes the expected performance if the recommended actions are taken (e.g., increased monthly installs of 93K). The recommendation 415 includes a "more details" button 420 and a "dismiss" button 425. Responsive to receiving an interaction from the user with the "more details" button 420, the action recommendation system 130 may present another interface with additional information such as detailed steps on how to perform the action. Responsive to receiving an interaction from the user with the "dismiss" button 425, the action recommendation system 130 may remove the recommendation 415 from the interface 400.

In some embodiments, the action recommendation system 130 may be connected to third party systems 140 such as Platform A, Platform B, or a media management system that is linked to Platform A or Platform B. After presenting the recommended actions, if the user approves of the actions, the action recommendation system 130 may trigger a workflow that executes the recommended action without further input from the user. For example, the action recommendation system 130 may use APIs of the third party systems 140 to execute the recommended actions, which simplifies the process for the user and improves the user experience.

Exemplary Flowchart for Action Recommendation

Figure 5:
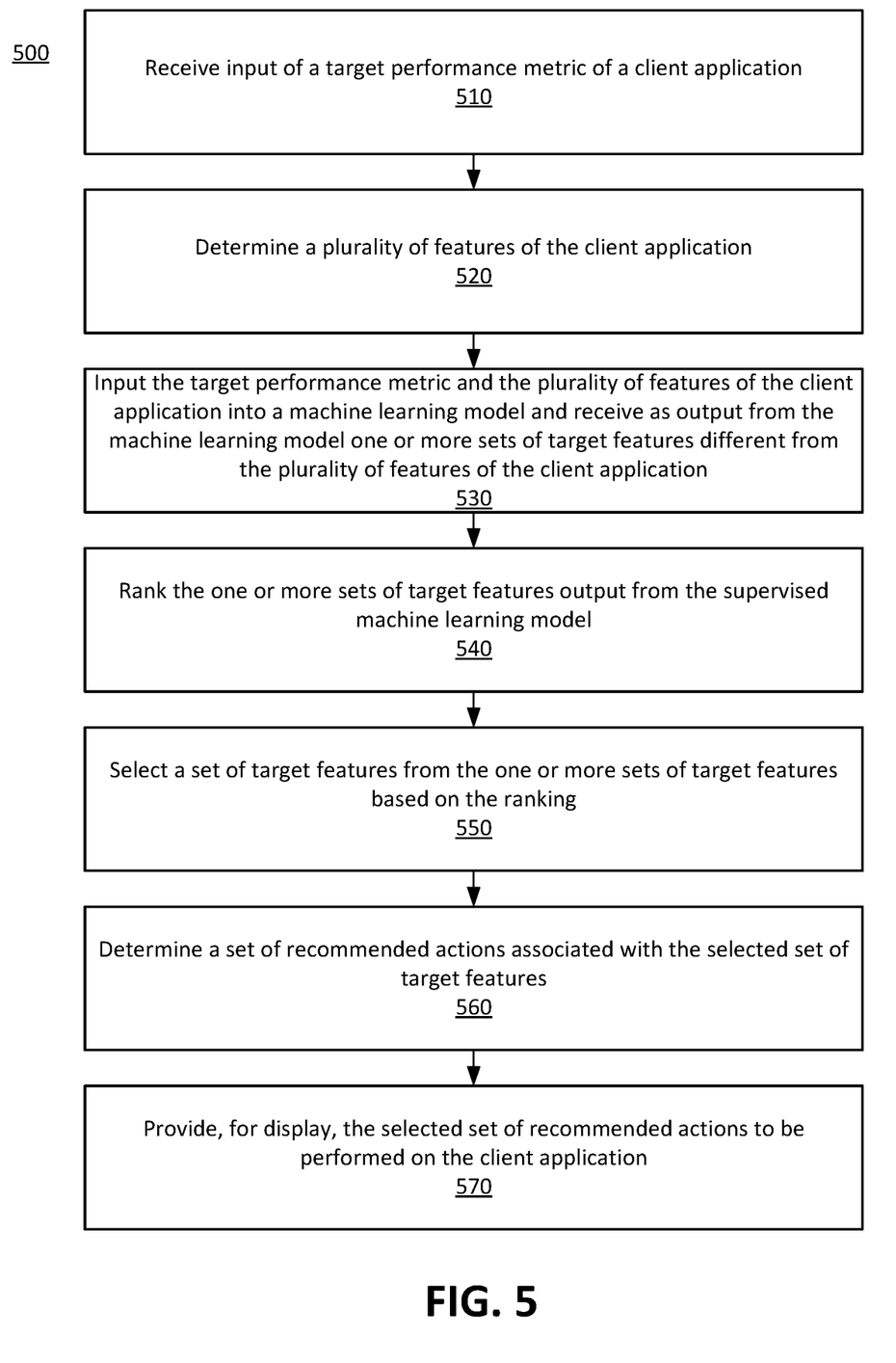
FIG. 5 illustrates an exemplary flow chart depicting a process for determining an action recommendation, according to an embodiment.

FIG. 5 illustrates an exemplary flow chart depicting a process for determining an action recommendation, according to an embodiment. Process 500 begins with the action recommendation system 130 receiving 510 input of a target performance metric (e.g., target performance metric 320) of a client application. The target performance metric is provided by a user associated with the client application and related to revenue, subscribing users, user engagement, user retention, or other goals for the client application. The action recommendation system 130 determines 520 a plurality of features of the client application (e.g., client application features 310). The action recommendation system 130 inputs 530 the target performance metric (e.g., target performance metric 320) and the plurality of features of the client application (e.g., client application features 310) into a machine learning model (e.g., machine learning model 255) and receiving as output from the machine learning model one or more sets of target features (e.g., target features set 340) different from the plurality of features (e.g., client application features 310) of the client application. The action recommendation system 130 ranks 540 the one or more sets of target features output from the supervised machine learning model. The action recommendation system 130 selects 550 a set of target features (e.g., selected target features set 350) from the one or more sets of target features based on the ranking. The action recommendation system 130 determines 560 a set of recommended actions (e.g., recommended actions 360) associated with the selected set of target features. The action recommendation system 130 provides 570 the selected set of recommended actions for display (e.g., in the user interface 400) to be performed on the client application.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for predicting claim outcomes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, from a client device, input of a target performance metric of a client application;
   determining a plurality of features of the client application;
   inputting the target performance metric and the plurality of features of the client application into a machine learning model and receiving as output from the machine learning model one or more sets of target features different from the plurality of features of the client application, the machine learning model trained using training data including sets of changes in features associated with historical client applications, each of the sets labeled by corresponding changes in performance metrics of the historical client applications;
   ranking the one or more sets of target features output from the machine learning model based on sets of distance weights representing distances between the plurality of features of the client application and the one or more sets of target features;
   selecting a set of target features from the one or more sets of target features based on the ranking;
   determining a set of recommended actions associated with the selected set of target features; and
   providing, for display at the client device, the selected set of recommended actions to be performed on the client application.

2. The method of claim 1 further comprising:
   identifying one or more adjustable features; and
   inputting the one or more adjustable features into the machine learning model.

3. The method of claim 2, wherein the selected set of recommended actions are configured to cause change in the one or more adjustable features.

4. The method of claim 2, wherein the one or more adjustable features are indicated by an input received from the client device.

5. The method of claim 1, wherein the features of the client application include one or more of characteristics of the client application, and performance of the client application.

6. The method of claim 1, wherein ranking the one or more sets of target features is based on an expected change in the target performance metric.

7. The method of claim 1, wherein ranking the one or more sets of target features is based on a number of target features in the one or more sets of target features.

8. A non-transitory computer-readable medium comprising computer program instructions that, when executed by a computer processor, cause the processor to perform operations, the instructions comprising instructions to:
   receive, from a client device, input of a target performance metric of a client application;
   determine a plurality of features of the client application;
   input the target performance metric and the plurality of features of the client application into a machine learning model and receiving as output from the machine learning model one or more sets of target features different from the plurality of features of the client application, the machine learning model trained using training data including sets of changes in features associated with historical client applications, each of the sets labeled by corresponding changes in performance metrics of the historical client applications;
   rank the one or more sets of target features output from the machine learning model based on sets of distance weights representing distances between the plurality of features of the client application and the one or more sets of target features;
   select a set of target features from the one or more sets of target features based on the ranking;
   determine a set of recommended actions associated with the selected set of target features; and
   provide, for display at the client device, the selected set of recommended actions to be performed on the client application.

9. The non-transitory computer-readable medium of claim 8, wherein the instructions comprise instructions to:
   identify one or more adjustable features; and
   input the one or more adjustable features into the machine learning model.

10. The non-transitory computer-readable medium of claim 9, wherein the selected set of recommended actions are configured to cause change in the one or more adjustable features.

11. The non-transitory computer-readable medium of claim 9, wherein the one or more adjustable features are indicated by an input received from the client device.

12. The non-transitory computer-readable medium of claim 8, wherein the features of the client application include one or more of characteristics of the client application, and performance of the client application.

13. The non-transitory computer-readable medium of claim 8, wherein ranking the one or more sets of target features is based on an expected change in the target performance metric.

14. The non-transitory computer-readable medium of claim 8, wherein ranking the one or more sets of target features is based on a number of target features in the one or more sets of target features.

15. A system comprising:
one or more processors; and
a non-transitory computer-readable medium comprising computer program instructions that, when executed by the one or more processors, cause the one or more processors to perform operations comprising:
  receiving, from a client device, input of a target performance metric of a client application;
  determining a plurality of features of the client application;
  inputting the target performance metric and the plurality of features of the client application into a machine learning model and receiving as output from the machine learning model one or more sets of target features different from the plurality of features of the client application, the machine learning model trained using training data including sets of changes in features associated with historical client applications, each of the sets labeled by corresponding changes in performance metrics of the historical client applications;
  ranking the one or more sets of target features output from the machine learning model based on sets of distance weights representing distances between the plurality of features of the client application and the one or more sets of target features;
  selecting a set of target features from the one or more sets of target features based on the ranking;
  determining a set of recommended actions associated with the selected set of target features; and
  providing, for display at the client device, the selected set of recommended actions to be performed on the client application.

16. The system of claim 15, to the operations further comprising:
  identifying one or more adjustable features; and
  inputting the one or more adjustable features into the machine learning model.

17. The system of claim 16, wherein the selected set of recommended actions are configured to cause change in the one or more adjustable features.

18. The system of claim 16, wherein the one or more adjustable features are indicated by an input received from the client device.

* * * * *